UNITED STATES PATENT OFFICE.

CHARLES H. WATERS, OF GROTON, ASSIGNOR TO THE CLINTON WIRE CLOTH COMPANY, OF CLINTON, MASSACHUSETTS.

IMPROVEMENT IN PAINTING WIRE-CLOTH.

Specification forming part of Letters Patent No. 84,520, dated December 1, 1868; Reissue No. 4,463, dated July 4, 1871; Reissue No. 6,626, dated August 31, 1875; Reissue No. 8,022, dated January 1, 1878; application filed December 6, 1877.

DIVISION A.

*To all whom it may concern:*

Be it known that I, CHARLES H. WATERS, of Groton, in the county of Middlesex and State of Massachusetts, have invented or discovered a new and useful Improvement in the Art of Painting Wire-Cloth, of which the following is a specification:

Heretofore the painting of wire-cloth has been done by hand, and the process has necessarily been slow and expensive. I have invented an improved method of producing the finished article by the aid of machinery, which does the work better than can be done by hand, and with more rapidity and economy.

My improvement consists in a novel method of mechanically coating the entire surface of the wire-cloth with a surplus of paint, and then, while it is thus thoroughly coated, subjecting it to pressure between surfaces whereby the surplus paint is pressed or squeezed off, and a smooth surface is given to the painted wire-cloth, without waste of paint.

As the wire is rigid or unyielding against lateral pressure, and as the wire-cloth is of double the thickness at the intersection of the wires than at other points, its thorough painting by mechanism has been attended with great difficulties. I have, however, devised an apparatus suitable for carrying out the object of my invention in the art of painting wire-cloth, which apparatus is described in reissued Letters Patent No. 6,625, granted to me August 31, 1875, for "improvement in machines for painting wire-cloth," being a division of the original Letters Patent upon which this present application is based; but I wish it to be understood that I do not confine myself to the use of any particular apparatus or machinery for the purpose, as my improvement may be practiced by the use of various apparatus of different constructions performing the operations in which I have above stated my improvement to consist.

Thus, in the particular apparatus described in Reissue No. 6,625, hereinbefore referred to, the preliminary coating of the wire-cloth is accomplished by passing it through a vat containing a mass of paint—a mode of operation which I conceive to have certain specific advantages.

I believe myself to be the first ever to have painted wire-cloth by mechanism which first coated it with paint, and then subjected it to pressure between surfaces to squeeze off the surplus paint.

It is obvious that in the use of machinery these processes are carried on in continuity, and almost simultaneously; and this constitutes an essential advantage of my invention.

I do not, therefore, limit myself to any particular mechanism by which the preliminary coating is accomplished.

I claim—

1. The hereinbefore-described improvement in the art of mechanically painting wire-cloth, which consists in coating its entire surface with paint, and then squeezing or pressing out the surplus paint between surfaces, substantially as set forth.

2. The hereinbefore-described improvement in the art of mechanically painting wire-cloth, which consists in passing the wire-cloth successively through a mass of paint thoroughly to coat its entire surface, and then between surfaces which press or squeeze off the surplus paint, substantially as set forth.

CHARLES H. WATERS.

Witnesses:

H. H. WATERS,

J. HENRY TAYLOR.